May 31, 1949.   G. MALCOM   2,472,046
BRAKING MEANS FOR ELECTRIC MOTORS
Filed June 28, 1946

INVENTOR.
GLEN MALCOM,
BY: Harold B. Hood.
ATTORNEY.

Patented May 31, 1949

2,472,046

UNITED STATES PATENT OFFICE 2,472,046

BRAKING MEANS FOR ELECTRIC MOTORS

Glen Malcom, Columbus, Ind., assignor to Reeves Pulley Company, Columbus, Ind., a corporation of Indiana Application June 28, 1946, Serial No. 679,965

7 Claims. (Cl. 318—31)

The present invention relates to braking means for electric motors, and is primarily concerned with the provision of means, automatically actuated upon deenergization of a selected winding of a reversible electric motor, to connect a capacitor between the ends of the other winding thereof, whereby the motor will be substantially instantaneously brought to rest. The invention finds particular utility as an adjunct to, or improvement upon, the motor controlling mechanism disclosed and claimed in my co-pending application Serial No. 671,619 filed May 22, 1946, and therefore the invention has been illustrated, and will be described, in connection with that control. It is to be understood, however, that the present invention finds utility in other assemblies, and that its scope is not limited by the environment in which it is so illustrated and described.

To the accomplishment of the above and related objects, my invention may be embodied in the form illustrated in the accompanying drawings, attention being called to the fact, however, that the drawings are illustrative only, and that change may be made in the specific construction illustrated and described, so long as the scope of the appended claims is not violated.

Figure 1:
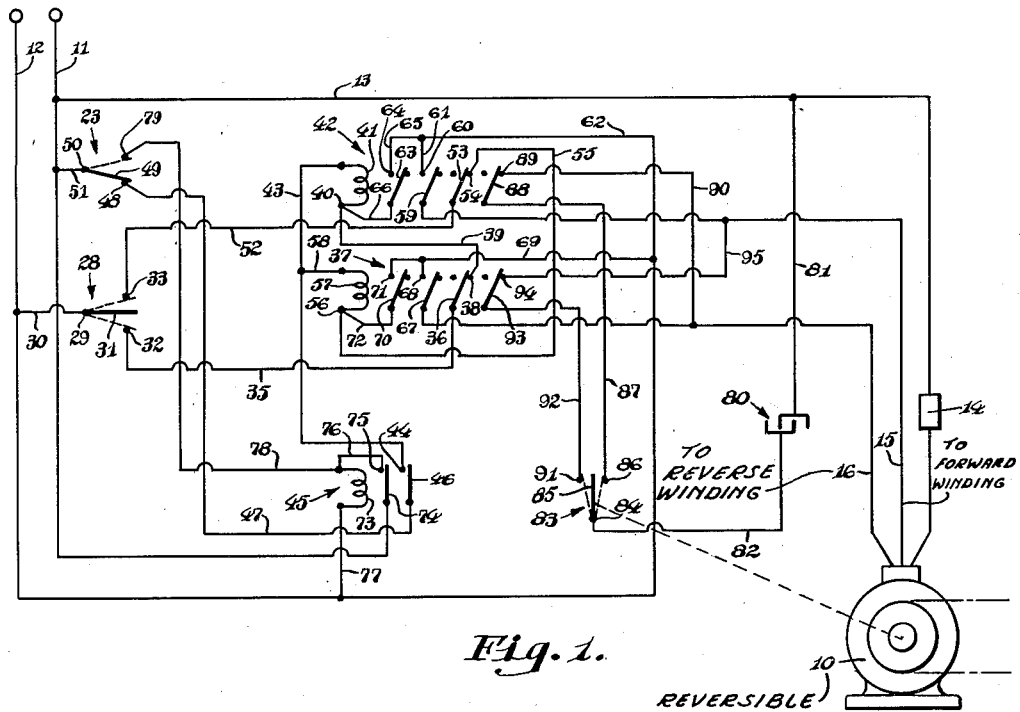
Fig. 1 is a wiring diagram disclosing my present invention incorporated in a control means for a reversible electric motor.

Referring more particularly to the drawings, it will be seen that I have illustrated a reversible electric motor 10 adapted to be energized from a power source indicated by the wires 11 and 12. A lead 13, extending from the wire 11 through an overload relay 14, is common to the forward and reverse windings of the motor 10, the other ends of said windings being respectively provided with leads 15 and 16.

As illustrated, the assembly may include an indicator dial 17 adapted to be manually manipulated to rotate a shaft 18 upon which is mounted a disc 19 carrying a cam 20. Coaxial with, but independently rotatable relative to, the shaft 18 is a second shaft 21 carrying a disc 22 upon which is supported a switch 23 provided with a plunger 24. The switch 23 may be of well known characteristics, being normally closed, but adapted to be moved to open position by inward movement of a plunger 24 which is positioned for registration with the cam 20. Obviously, when the cam 20 moved out of engagement with the plunger 24, the switch 23 will be closed, and said switch will remain closed until the plunger and the cam again come into registry. The shaft 21 may carry a gear 25 meshing with a gear 26 upon a shaft 27 connected to be driven by the motor 10. The shaft 27 may be considered as representing an element whose position is to be controlled. The construction is such (as will appear from the following specification) that when the dial 17 is manipulated, the motor will be energized in such a direction as to drive the disc 22 in the same direction in which the disc 19 has been turned, so that the plunger 24 of the switch 23 will follow the cam 20 until registry thereof is again achieved.

A selector or direction switch 28 includes a terminal 29 connected by a wire 30 to the supply wire 12. A shiftable arm 31 is movable between terminals 32 and 33 of said selector switch. The terminal 32 is connected by a wire 35 with a switch arm 36 comprising an element of a multiple switch indicated generally by the reference numeral 37. Said switch arm 36 is normally in contact with terminal 38 which is connected by a wire 39 with one end 40 of a relay 41 connected to operate a multiple switch indicated generally by the reference numeral 42. The other end of said relay is connected by a wire 43 to one terminal 44 of a double pole switch 45, one arm 46 of which is cooperative with the terminal 44 and is connected by a wire 47 with the main terminal 48 of the main switch 23, whose arm 49 is electrically associated with a terminal 50 connected by a wire 51 with the power line 11.

The terminal 33 of the switch 28 is connected by a wire 52 with one arm 53 of the switch 42, said arm normally being in contact with a terminal 54 connected by a wire 55 with one end 56 of the relay 57 which is an element of the switch 37. The other end of said relay 57 is connected by a wire 58 with the wire 43 and so, through the switch arm 46, to the terminal 48 of the main switch 23.

The forward lead 15 of the motor 10 is connected to another arm 59 of the switch 42, said arm normally being out of contact with the terminal 60 of said switch connected, by wire 61, with a wire 62 which leads to the power line 12. Obviously, when the relay 41 is energized, the switch arm 59 will be moved into contact with terminal 60 to close the forward energization circuit for the motor 10.

A third switch arm 63 of the switch 42 is normally out of contact with a terminal 64 connected by wire 65 to wire 62. Said switch arm 63 is connected by wire 66 to terminal 40 of the relay 41. Thus, energization of the relay 41 will close a holding circuit for said relay which may be traced from wire 11 through wire 51, switch arm 49, terminal 48, wire 47, switch arm 46, terminal 44, wire 43, relay 41, wire 66, switch arm 63, teminal 64, wire 65, and wire 62 to wire 12.

Similarly, the reverse lead 16 of the motor is connected to switch arm 67 of switch 37 which is normally out of contact with terminal 68 connected by wire 69 with wire 62, and so with power line 12. The reverse circuit for the motor is thus closed by energization of the relay 57. Energization of said relay likewise shifts switch arm 70 of the switch 37 into contact with the terminal 71 which is connected by a wire 69 and wire 62 with power line 12. Said switch arm is connected, by wire 72, with terminal 56 of relay 57, so that closure of said switch arm 70 establishes an energizing circuit for said relay from power line 11 through switch arm 49, wire 47, switch arm 46, terminal 44, wire 43, wire 58, relay 57, wire 72, switch arm 70, wire 69, and wire 62 to power line 12.

The switch 45 includes a relay 73 which is normally energized, to hold the arm 46 in contact with the terminal 44, through a circuit which may be traced from power line 11, through switch arm 74, likewise under the control of the relay 73, terminal 75, wire 76, relay 73, and wire 77 to power line 12. In case of power failure, the relay 73 will be deenergized to permit switch arms 46 and 74 to move away from their terminals 44 and 75. Thus, the whole system is deactivated until the cam 20 is brought into registry with the plunger 24 to move the switch arm 49 into contact with the terminal 79. Thereby, an energizing circuit for the relay 73 is established from wire 11 through switch arm 49, terminal 79, wire 78, relay 73, wire 77, to power line 12, to close the switch arms 74 and 46.

Figure 3:
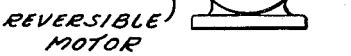
Fig. 3 is a transverse section, upon an enlarged scale, showing a detail of the assembly.

A capacitor 80 has one side connected, by wire 81, with the common lead 13 for the windings of the motor 10. The other side of said capacitor is connected by a wire 82 with the common terminal 84 of a second selector switch 83. Said switch is associated with the shaft 21, and its arrangement is illustrated in Fig. 3. A ring 34 is frictionally engaged with the shaft 21 and carries an arm 85 positioned between the terminals 86 and 91. Movement of the shaft 21 in one direction will bring the arm 85 into contact with terminal 86 and such contact will be maintained during further movement of the shaft in the same direction, and until the shaft is moved in the opposite direction, the shaft slipping with respect to the ring 34 upon further movement after the arm 85 has engaged the contact 86. Movement of the shaft 21 in the opposite direction will shift the arm 85 into contact with the terminal 91. The construction of the switch 28 may be analogous to the construction of the switch 83.

Terminal 86 of the switch 83 is connected by a wire 87 with a fourth switch arm 88 of the switch 42, said arm being normally in contact with a terminal 89 connected, by wire 90, with the reverse motor lead 16. Terminal 91 of the switch 83 is connected by wire 92 with the switch arm 93 of the switch 37, which arm is normally in contact with a terminal 94 connected, by wire 95, with the forward motor lead 15.

Thus, it will be seen that, if the switch arm 85 is in contact with terminal 86 and switch arm 88 is in contact with terminal 89, the capacitor 80 will be connected between the ends of the reverse motor winding, or across the reverse energizing circuit for said motor; while if switch arm 85 is in contact with terminal 91, while the switch arm 93 is in contact with terminal 94, the capacitor 80 will be connected between the ends of the forward winding of said motor, or across the forward energizing circuit.

The arrangement is such that forward operation of the motor will shift the switch arm 85 into contact with the terminal 86, and reverse operation of the motor will shift said arm into contact with the terminal 91.

Figure 2:
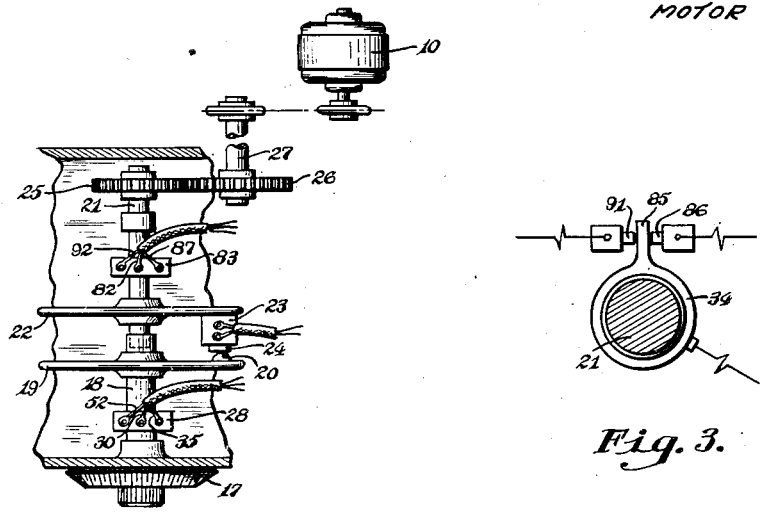
Fig. 2 is a fragmental elevation of one assembly in which the present invention may be utilized.

If the dial 17 is turned in a clockwise direction as viewed from the bottom of Fig. 2, the cam 20 will be moved out of registry with the plunger 24 and the switch arm 31 will be moved into engagement with the terminal 32. The plunger 24 drops to move the switch arm 49 into contact with terminal 48.

Thus, an energizing circuit for the relay 41 is established from power line 11 through wire 51, switch arm 49, wire 47, switch arm 46, wire 43, relay 41, wire 39, switch arm 36, wire 35, terminal 32, switch arm 31, and wire 30 to power line 12. Thereby, switch arm 63 is moved into contact with terminal 64, switch arm 59 is moved into contact with terminal 60, and switch arms 53 and 88 are moved out of contact with their terminals 54 and 89 respectively. Engagement of the switch arm 63 with the terminal 64 establishes the holding circuit for the relay 41, above described; movement of the switch arm 53 out of contact with terminal 54 makes the establishment of an energizing circuit for the relay 57 impossible; and movement of the switch arm 59 closes the forward energizing circuit of the motor 10 from power line 11 through wire 13, overload relay 14, wire 15, switch arm 59, terminal 60, wire 61, and wire 62 to power line 12.

As the motor begins to rotate the shaft 21, the arm 85 is shifted into contact with terminal 86.

Now, when plunger 24 comes into registry with cam 20, the switch arm 49 will be lifted out of contact with terminal 48 to break the holding circuit for the relay 41; and the switch arms 63, 59, 53 and 88 will drop into the illustrated positions. Thereby, the capacitor 80 is connected across the reverse circuit for the motor 10, and the motor is brought to a substantially instantaneous stop.

When the current supply to the forward motor winding is broken, the rotor of the motor tends to continue to spin under momentum. Under these conditions, the motor assumes the characteristics of a generator; and since the capacitor 80 is connected across the reverse winding of the motor, a potential will be applied to the capacitor to build up therein an electrical charge. During the infinitesimal period of building that charge, the capacitor, of course, acts as a load upon the generator effect of the motor, so that a slight dynamic braking effect is exerted upon the rotor. As the rotor decelerates, the generated voltage will fall below the value of the capacitor's charge, and the capacitor will be discharged into the motor windings to exert a "plugging" effect upon the rotor.

All of these actions occur in a time much shorter than the time required to describe them, and it has been found, in actual practice, that the rotor is brought to a substantially instantaneous stop, whereby coasting, which would inevitably result in "hunting" by the control assembly, is effectively prevented.

The action of the parts, when the dial 17 is turned in the opposite direction to move the switch arm 31 into contact with terminal 33 is entirely analogous to the action above described, and therefore it is deemed unnecessary to detail that action.

I claim as my invention:

1. For use with a reversible electric motor having a forward winding and a reverse winding, an energizing circuit for said forward winding, an energizing circuit for said reverse winding, and switch means dominating said circuits, said switch means including a switch arm movable between a position establishing the circuit for one of said windings and a position breaking said one circuit, a capacitor, and a second arm movable with said switch arm and operative to connect said capacitor between the ends of the other of said windings upon movement of said first switch arm to said last-named position.

2. For use with a reversible electric motor having a forward winding and a reverse winding, an energizing circuit for said forward winding, an energizing circuit for said reverse winding, and switch means dominating said circuits, said switch means including a first switch arm movable between a position establishing the circuit for said forward winding and a position opening said circuit, a second switch arm movable between a position establishing the circuit for said reverse winding and a position opening said circuit, a capacitor, a third switch arm movable with said first switch arm and operative to connect said capacitor between the ends of said reverse winding upon movement of said first switch arm to circuit-opening position, and a fourth switch arm movable with said second switch arm and operative to connect said capacitor between the ends of said forward winding upon movement of said second switch arm to circuit-opening position.

3. Means for braking a reversible electric motor having a forward winding and a reverse winding, comprising an energizing circuit for said forward winding, an energizing circuit for said reverse winding, a capacitor, and switch means dominating said circuits and operative, upon movement to open either of said circuits, to connect said capacitor between the ends of the other of said windings.

4. For use with a reversible electric motor having a forward winding and a reverse winding, a forward lead connecting one end of said forward winding with one side of a current source, a reverse lead connecting one end of said reverse winding with said side of such current source, a common lead connecting the other end of each of said windings with the other side of said current source, a first switch in said forward lead, a second switch in said reverse lead, a capacitor, means connecting one side of the capacitor with said common lead, a two-position switch connected to the other side of said capacitor, means including a third switch connecting one position of said two-position switch with said reverse lead, means including a fourth switch connecting the other position of said two-position switch with said forward lead, said third switch being always open when said first switch is closed and closed when said first switch is open, said fourth switch being always open when said second switch is closed and closed when said second switch is open, and means for alternatively closing said first and second switches.

5. For use with a reversible electric motor having a forward winding and a reverse winding, a forward lead connecting one end of said forward winding with one side of a current source, a reverse lead connecting one end of said reverse winding with said side of such current source, a common lead connecting the other end of each of said windings with the other side of said current source, a first switch in said forward lead, a second switch in said reverse lead, a capacitor, means connecting one side of said capacitor with said common lead, a two-position switch connected to the other side of said capacitor, means including a third switch connecting one position of said two-position switch with said reverse lead, means including a fourth switch connecting the other position of said two-position switch with said forward lead, said third switch being always open when said first switch is closed and closed when said first switch is open, said fourth switch being always open when said second switch is closed and closed when said second switch is open, means for alternatively closing said first and second switches, and means driven by said motor for setting said two-position switch in said one position when said forward winding is energized and for setting said two-position switch in said other position when said reverse winding is energized.

6. In a mechanism for positioning a load accurately in response to manipulation of a control member, a reversible electric motor connected to shift said load, forward and reverse circuits for alternatively energizing said motor, a switch dominating both said circuits, a selector switch connected to activate either of said circuits alternatively, an oppositely shiftable control member operatively connected to said selector switch to activate one of said circuits upon movement in one direction and to activate the other of said circuits upon movement in the other direction, other means operatively connected to said control member and actuated, by movement of said control member in either direction, to close said first-named switch, whereby said motor is energized, means driven by said motor to follow said other means to open said first-named switch after movement of said last-named means to a degree determined by the degree of movement of said other means, a capacitor, and means actuated by said last-named means to connect said capacitor across that one of said circuits not selected by said selector switch.

7. Control mechanism for a reversible electric motor, comprising a forward motor circuit and a reverse motor circuit for alternatively energizing said motor, a first normally open switch in said forward circuit, a second normally open switch in said reverse circuit, a first relay for said first switch operable, upon energization, to close the same, a second relay for said second switch operable, upon energization, to close the same, energizing circuits for said respective relays, a normally closed switch in each of said relay-energizing circuits connected to be opened upon closure of the other of said relay-energizing circuits, a main switch connected in both of said relay-energizing circuits, a selector switch movable oppositely to enter, alternatively, said respective relay-energizing circuits, a normally open holding circuit for each of said relays, each excluding said selector switch and closed upon energization of its included relay, a capacitor, means connecting one side of said capacitor to one side of each of said motor circuits, means including a third normally closed switch and a second selector switch for connecting the other side of said capacitor with the other side of said reverse motor circuit, means including a fourth normally closed switch and said second selector switch for connecting said other side of said capacitor with the other side of said forward motor circuit, said first relay being operable, upon energization, to open said third normally closed switch and said second relay being operable, upon energization to open said fourth normally closed switch, means for moving said first-named selector switch in either direction and for concurrently closing said main switch, means actuated by said motor to shift said second selector switch to connect said other side of said capacitor to said reverse motor circuit upon forward operation of said motor or to said forward motor circuit upon reverse operation of said motor, and means driven by said motor to follow said main-switch-closing means to open said main switch.

GLEN MALCOM.

REFERENCES CITED

The following references are of record in the file of this patent:

UNITED STATES PATENTS

| Number | Name | Date |
|---|---|---|
| 1,684,315 | Haller | Sept. 11, 1928 |
| 1,861,245 | Smith | May 31, 1932 |
| 2,167,850 | Phillips | Aug. 1, 1939 |
| 2,210,426 | Noack | Aug. 6, 1940 |
| 2,355,381 | Lear | Aug. 8, 1944 |